(12) United States Patent
Issacci et al.

(10) Patent No.: US 6,686,084 B2
(45) Date of Patent: Feb. 3, 2004

(54) GAS BLOCK MECHANISM FOR WATER REMOVAL IN FUEL CELLS

(75) Inventors: Farrokh Issacci, Playa Del Rey, CA (US); Timothy J. Rehg, Rancho Palos Verdes, CA (US)

(73) Assignee: Hybrid Power Generation Systems, LLC, Torrance, CA (US)

( * ) Notice: Subject to any disclaimer, the term of this patent is extended or adjusted under 35 U.S.C. 154(b) by 185 days.

(21) Appl. No.: 10/039,503

(22) Filed: Jan. 4, 2002

(65) Prior Publication Data

US 2003/0129468 A1 Jul. 10, 2003

(51) Int. Cl.[7] .............................. H01M 2/00; H01M 8/00
(52) U.S. Cl. ............................... 429/34; 429/38; 429/13
(58) Field of Search .............................. 429/34, 44, 25, 429/13, 38, 39

(56) References Cited

U.S. PATENT DOCUMENTS

| 5,441,819 A | 8/1995 | Voss et al. |
| 5,840,414 A | 11/1998 | Bett et al. |
| 5,853,909 A | 12/1998 | Reiser |
| RE36,148 E | 3/1999 | Strasser |
| 5,939,218 A | 8/1999 | Mizuno |
| 5,998,058 A | 12/1999 | Fredley |
| 6,015,633 A | 1/2000 | Carlstrom, Jr. et al. |
| 6,083,638 A | 7/2000 | Taniguchi et al. |
| 6,117,579 A | 9/2000 | Gyoten et al. |
| 6,503,653 B2 * | 1/2003 | Rock .............................. 429/35 |
| 2002/0106546 A1 * | 8/2002 | Perry et al. .................... 429/34 |
| 2003/0124410 A1 * | 7/2003 | Yi et al. ........................ 429/38 |

* cited by examiner

Primary Examiner—Patrick Ryan
Assistant Examiner—Raymond Alejandro
(74) Attorney, Agent, or Firm—Sutherland Asbill & Brennan LLP

(57) ABSTRACT

The present invention is directed to apparatus and method for cathode-side disposal of water in an electrochemical fuel cell. There is a cathode plate. Within a surface of the plate is a flow field comprised of interdigitated channels. During operation of the fuel cell, cathode gas flows by convection through a gas diffusion layer above the flow field. Positioned at points adjacent to the flow field are one or more porous gas block mediums that have pores sized such that water is sipped off to the outside of the flow field by capillary flow and cathode gas is blocked from flowing through the medium. On the other surface of the plate is a channel in fluid communication with each porous gas block mediums. The method for water disposal in a fuel cell comprises installing the cathode plate assemblies at the cathode sides of the stack of fuel cells and manifolding the single water channel of each of the cathode plate assemblies to the coolant flow that feeds coolant plates in the stack.

12 Claims, 4 Drawing Sheets

GAS BLOCK MECHANISM FOR WATER REMOVAL IN FUEL CELLS

GOVERNMENT RIGHTS

This invention was made with the support of the United States Government under Contract DE-FC02-97EE50470 awarded by the Department of Energy under its 50 Kilowatt Fuel Cell Stack Development Program. The Government may have certain rights to this invention.

BACKGROUND OF THE INVENTION

This invention pertains generally to polymer electrolyte membrane fuel cells and more particularly to an apparatus and method for disposal of water.

In the normal operation of a polymer electrolyte membrane "PEM" fuel cell, liquid water forms at the cathode side of the fuel cell. There are two sources for this liquid water. One source is the oxidizing gas being fed to the cathode side of the fuel cell. This gas is generally moisturized before being supplied to the cathode and some of this moisture condenses. The other source is an electrochemical reaction occurring on the cathode side which produces water. Discharging oxidizing gas has a limited capacity to carry away to outside the cell the liquid water formed at the cathode side.

When the quantity of liquid water formed on the cathode side exceeds the liquid water carried away by the oxidizing gas, there is a condition called a "flooded state" or "flooding." In a flooded state, the liquid water remains on the surface of the cathode electrode and obstructs the dispersion of the oxidizing gas onto the surface of the cathode. This in turn results in a drop in the cell's voltage and amperage output. Ultimately, flooding will stop the cell's operation.

Similarly, the water accumulation can also take place in the anode plates of fuel cells. The anode flow is normally humidified before it is introduced to the anode plates. During operation when anode gas is consumed by chemical reaction of the fuel cell, the water content of the anode flow condenses to liquid water. To avoid flow blockage the condensed water has to be removed from the anode plates.

One conventional water removal technique is wicking, or directing the accumulated water away from the cathode using capillaries incorporated in the cathode. Another related water removal technique employs screens or meshes within the cathode to conduct water away from the catalyst layer. Still another go conventional water removal technique is to incorporate hydrophobic substances, such as polytetrafluoroethylene (trade name Teflon RTM,) into the cathode sheet material to urge accumulated water away from the cathode. This type of apparatus has the disadvantages of being limited in quantity of liquid water that can be removed from the flowfield and being limited in mass transfer of cathode gas to the polyelectrolyte membrane of the fuel cell.

It is known in the art to remove water at the cathode side by utilizing an electrode layer comprised of a porous base area with water repellency and plurality of penetration areas higher in water permeability scattered over or formed through the base area. This facilitates the oozing of water generated on the catalytic layer of the PEM fuel cell into the gas channels through the areas of higher permeability. These types of apparatus have the disadvantage of focusing on removing water at the catalytic area adjacent to the polyelectrolyte membrane; being limited in the quantity of water that can be removed and being limited in mass transfer of reactant gas to the polyelectrolyte membrane.

It is known in the art that an interdigitated flowfield will provide means for the reactant gases to flow through the gas diffusion layer (GDL). In this flowfield, the flow channels have dead-ends. The pressure difference between the inlet flow and exit flow in a plate provides the pressure head to force reactant gases to flow through the GDL. This flowfield configuration allows flow of reactants through a larger area of the GDL and provides a convection transport of reactants to support the reaction, improve the efficiency, and eliminate or reduce the mass transport limited operation. Also, flow of reactants through the GDL helps sweep the water produced in the GDL, and consequently, enhance the fuel cell operation.

It is also known in the art to remove fluid at electrodes by positioning a porous support layer near and in fluid communication with each electrode to facilitate fluid transport to and away from each electrode. The porous support layer includes hydrophobic pores and hydrophilic pores integrated throughout the layer. The fuel and oxidizing gasses are supplied through the hydrophobic pores and water is removed through the hydrophilic pores. This apparatus has the disadvantages of focusing on removing water at the electrode area; being limited in quantity of water that can be removed and being limited in mass transfer of cathode gas to the polyelectrolyte membrane.

A conventional fuel cell is comprised of a stack of PEM fuel cells. Such a conventional fuel cell may require a cooling plate for every cell. Reference is made to FIG. 2 in U.S. Pat. No. 5,840,414 and FIG. 3 in U.S. Pat. No. 5,853,909. To support the capillary action in the porous layers these patents require a cooling plate for every cell. This plurality of cooling plates increases the weight and volume of the fuel cell.

Accordingly, there exists a need for an apparatus and method to efficiently remove water produced at the cathode plates of a PEM fuel cell which enhances the flow of cathode gas to the catalytic area and avoids the loss of cathode gas. Further, there is a need for a fuel cell of reduced weight and volume. The present invention satisfies these needs, as well as others, and generally overcomes the presently known deficiencies in the art.

SUMMARY OF THE INVENTION

The present invention is directed to apparatus and method for disposal of water in an electrochemical fuel cell. The present invention of water removal technique can equally be used for anode or cathode plates. Taught here is an interdigitated flowfield with a gas block mechanism for water removal in fuel cells.

One aspect of the present invention is a cathode plate assembly for use with a cathode gas in polyelectrolyte membrane fuel cell. The assembly is comprised of the following major components: There is a cathode plate having a first major surface and a second oppositely opposed major surface (see FIG. 1A). Within the first major surface is a flow field comprised of feed side interdigitated channels and exhaust side interdigitated channels that are in an interdigitated configuration. During the operation of the fuel cell there is flow of cathode gas from feed side interdigitated channels to exhaust side interdigitated channels.

Positioned adjacent to the flow field, are one or more porous gas block mediums. These porous gas blocks have pores sized such that water is sipped off to the outside of the flow field by capillary flow and cathode gas is blocked from flowing through the medium. There is a gas diffusion layer in close contact and over the first surface of cathode plate with its flow field. On the second major surface of the cathode plate can be an anode flowfield or a coolant flowfield. In both cases, the gas block is either in fluid communication with the coolant flowfield or a coolant manifold. Alternatively, the second major surface of the cathode plate may include an anode flowfield for delivering hydrogen, or a hydrogen mixture, to the fuel cell. In this case, the gas blocks are generally in communication to a liquid water manifold generally positioned at the perimeter of the plate for the purpose of delivering water to those plates that do not have liquid water channels or to the second surface of the cathode plates. Note that the water channels can further serve the purpose of cooling channels, but are not required to have this function.

Similarly, an anode plate of design analogous to the cathode plate may encounter water accumulation. A gas block mechanism can also be used in an anode plate to help sweep water-to-water channels similar to those described above.

Another aspect of the present invention is a cathode plate assembly for use in a fuel cell with a pressurized cathode gas, and a pressurized coolant or an anode flowfield, comprised of the following components: A cathode plate having a first major surface and a second oppositely opposed major surface. A flow field for pressurized cathode gas within the first major surface having a feed side having a feed side internal plenum in fluid communication with one or more feed side interdigitated channels having width and with dead-ends and an exhaust side having an exhaust side internal plenum in fluid communication with a plurality of exhaust side interdigitated channels having width and with dead-ends, where the feed side and exhaust side interdigitated channels are in an interdigitated configuration defining land between the interdigated channels such that in the operation of the fuel cell there is flow of cathode gas by convection from feed side interdigitated channels to exhaust side interdigitated channels.

A multiplicity of porous gas block mediums positioned in the cathode plate adjacent to each feed side interdigitated channel at points where liquid water forms during the operation of the fuel cell and having pores sized such that liquid water in the feed side interdigitated channels is sipped off by capillary flow and cathode gas is blocked. A gas diffusion layer closely positioned over the first surface of the cathode plate and flow field therein. A water channel at the second major surface of the cathode plate, or a water manifold at the perimeter of the cathode plate, in fluid communication with each porous gas block medium through which pressurized water flows and where the pressure of the water and gas in feed side interdigitated channels is greater than the pressure of coolant in the water channel such that liquid water flows from each porous gas block medium into the cooling channel or a manifold whereby the water may be the coolant.

Another aspect of the present invention is a cathode plate assembly for use in a fuel cell with a pressurized cathode gas and a pressurized water comprised of the following components: A cathode plate that is a regular four sided polygon having a first major surface, a second oppositely opposed major surface and a first and third and second and fourth oppositely opposed pairs of edges where the first edge is at a higher gravitational potential energy than the third edge. A flow field for pressurized cathode gas (with a few atmospheres pressure) within the first major surface having a feed side internal plenum running parallel to the first edge of the cathode plate; a plurality of feed side interdigitated channels having widths that are in fluid communication with and substantially perpendicular to the feed side internal plenum that extend downward toward the third edge and terminate at dead-ends; an exhaust side internal plenum running parallel to the third edge of the cathode plate; a plurality of exhaust side interdigitated channels having widths that are in fluid communication with and substantially perpendicular to the exhaust side internal plenum that extend upward toward the first edge and terminate at dead-ends and which are interdigitated between the feed side interdigitated channels so as to define land between the interdigitated channelswhere the ratio of pressure drop per unit length of the cathode gas flow over the land between a feed side interdigitated channel and a neighboring exhaust side interdigitated channel and the feed side interdigitated channel cathode gas flow is in the range of about 8:1 to about 15:1. As a specific example, for a GDL, Toray TGPH-090 with a porosity of about 85%, the land width between the interdigitated channels, with 8 inch length, is in the range of about 2 to about 3 times larger than the width of the interdigitated channels such that cathode gas flows by convection from the feed side interdigitated channel to a neighboring exhaust side interdigitated channel.

A multiplicity of porous gas block mediums positioned adjacent to the dead-ends of each of the feed side interdigitated channels having a bubble point in the range of between about 10 psig to about 70 psig such that liquid water is sipped out of the feed side interdigitated channels by capillary flow and cathode gas is blocked. A gas diffusion layer closely positioned over the first surface of the cathode plate and flow field therein. A water channel at the second major surface of the cathode plate, or a manifold at the cathode plate perimeter, in fluid communication with each porous gas block medium through which pressurized coolant flows and where the pressure of the cathode gas in feed side interdigitated channels is greater than the pressure of water in water channels (but does not exceed the bubble point pressure) such that liquid water flows from the porous gas block medium to the water channel or manifold.

A further aspect of the present invention is a method of removing water accumulating at the cathode sides of a stack of electrochemical fuel cells with coolant plates having a coolant flow. The method is comprised of the following steps: installing at the cathode side of each of the fuel cells in the stack any one of the cathode plate assemblies of the present invention; manifolding the single water channel of each of the cathode plate assemblies to the coolant flow that feeds coolant plates; and generating electricity by passing anode and cathode gas through the fuel cell such that the produced liquid water at the cathode sides of each fuel cell is sipped off to the outside of the plate through porous gas mediums of the cathode plate assemblies.

The previously described versions of the present invention have many advantages which include enhanced removal of produced water with the avoidance of the loss of cathode gas and enhanced cathode gas diffusion to the membrane. A fuel cell comprised of PEM cells employing this apparatus is light weight and small in volume.

These and other features, aspects and advantages of the present invention will become better understood with reference to the following description, appended claims and accompanying drawings.

DETAILED DESCRIPTION OF THE INVENTION

The present invention provides a novel cathode assembly for an electrochemical fuel cell which is operable to distribute cathode gas to a membrane of the fuel cell and remove water produced at the cathode side without a loss of cathode gas. The cathode assembly is useful to avoid a flooded state. A fuel cell comprised of PEM cells employing this cathode assembly is lightweight and small in volume.

Figure 1A:
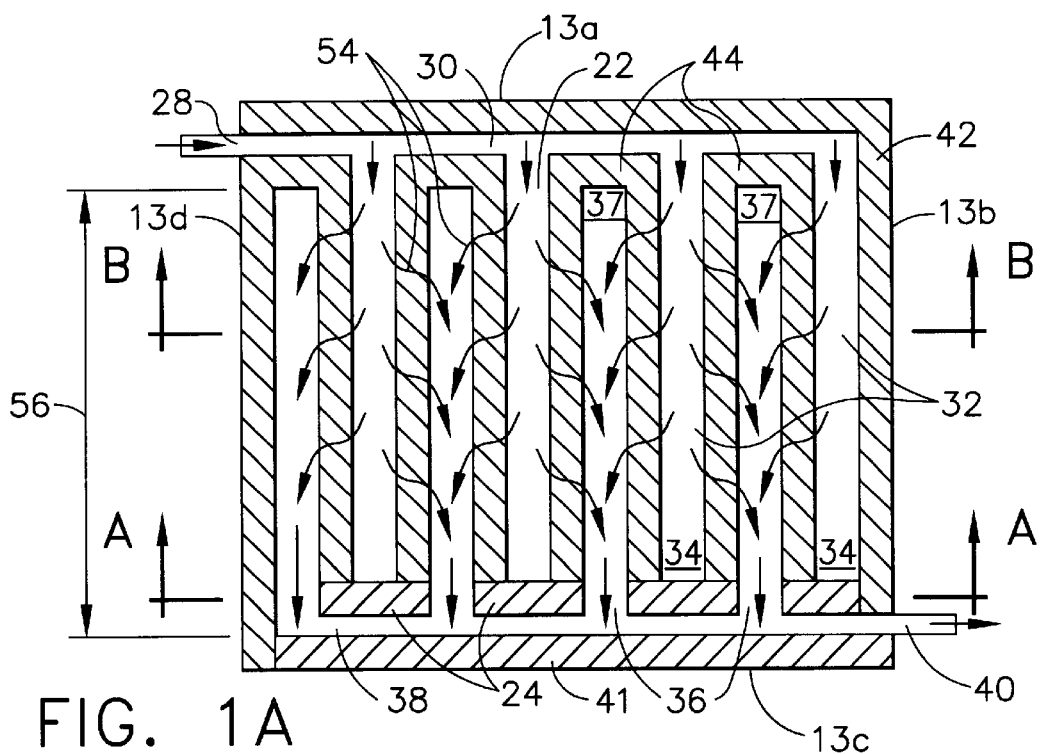
FIG. 1A is a top view of the cathode plate according to the present invention showing an interdigitated flow field and porous gas block mediums.
Figure 1B:
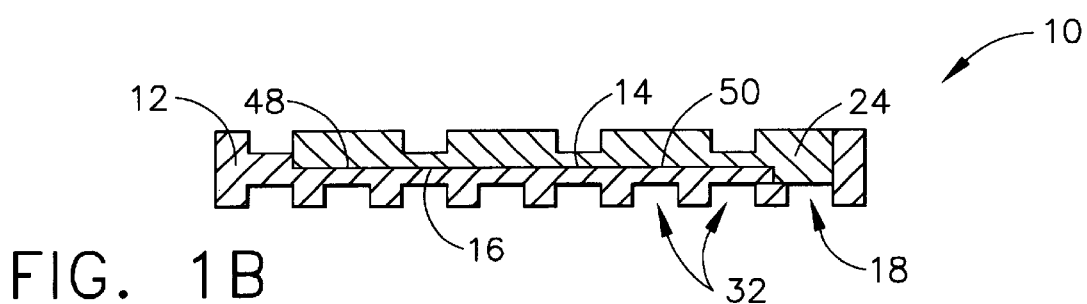
FIG. 1B is a cross-sectional view of the cathode plate depicted in FIG. 1A taken along line A—A showing the cooling channel, and the gas block mechanism.
Figure 1C:
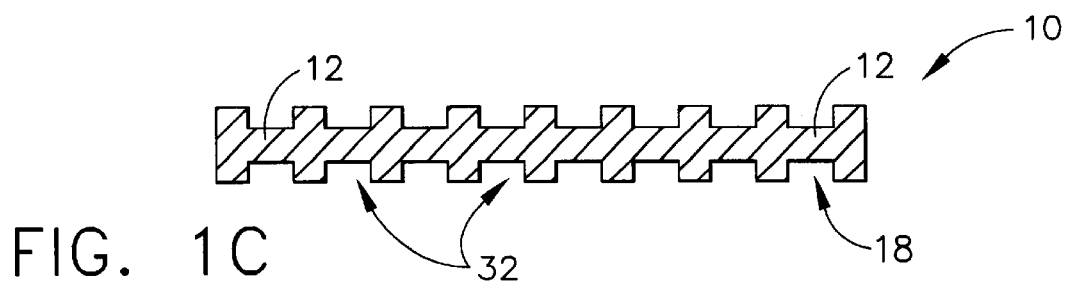
FIG. 1C is a cross-sectional view of the cathode plate depicted in FIG. 1A taken along line B—B showing the cooling channel, and the cathode plate cross-section.
Figure 3:
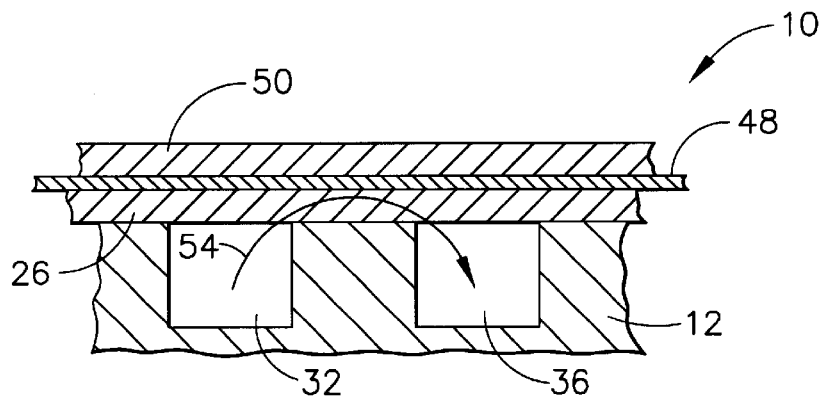
FIG. 3 is a cross-sectional view of a cathode plate assembly according to the present invention positioned against a polyelectrolyte membrane showing convection flow of cathode gas over the land and through the GDL.

Referring to FIGS. 1A–C, the cathode plate assembly 10 of the present invention may be comprised of the following major components. A cathode plate 12 has an inside surface 14 and an outside surface 16. On the outside surface 16 of the cathode plate 12 there may be a pressurized cooling channel 18 connected to a water reservoir (not shown). On the inside surface 14 of the cathode plate 12 there may be an interdigitated flow field 22 through which cathode gas flows. Inserted into the surface of the cathode plate 12 and adjacent to the flow field 22 are porous gas block mediums 24. Referring to FIG. 3, positioned over the inside surface 14 of the cathode plate with its flow field 22, there may be a gas diffusion layer 26 also known as the cathode side gas diffusion layer.

Continuing to refer to FIG. 1A, the cathode plate 12 may be made of an electrically conducting material selected from the group of graphite, carbon composites, conducting plastics, or a metal with a corrosion-resistant coating. It serves as a base for the cathode plate assembly 10 and may be a connection surface to an external circuit through which electrons flow.

Continuing to refer to FIGS. 1A and 1B, the cathode plate 12 may have two opposed major surfaces 14 and 16. One major surface is designated the inside surface 14, and the other major surface is designated the outside surface 16. In one embodiment of the invention, the cathode plate 12 may be a square which defines four edges 13a through 13d.

On the outside surface 16 of the cathode plate 12 there may be a cooling channel 18 which is in fluid communication with reservoir (not shown) in the figures.) The cooling channel 18 may be formed on the outside surface 16 of the cathode plate 12 by molding, milling, compression and other processes, all known in the art. As will be further explained below, the cooling channel 18 may be positioned so as to be in fluid communication with porous gas block mediums 24. The outside surface 16 may include anode flowfield, or coolant flowfield.

The cooling channel 18 may be pressurized. The pressure may be set at a value less than that of a cathode gas during the operation of the cell. Typically the cathode pressure falls in the range of a few psig to 30 psig or higher. In one embodiment of the invention, the cooling rate allows for one coolant plate for more than one cell. In this case, the single water channels 18 in a cell are manifolded to the coolant flow that also feeds the coolant plates in the stack. The water channel 18 may be manifolded to a water reservoir separate from the coolant flow.

The coolant may be any liquid or solution of liquids that have a heat transfer capability without boiling at the operation of the fuel cell and are capable of dissolving water. Coolants are well known in the art. Water is suitable to be used as coolant with or without the addition of an additive to alter its boiling point such as polyethyleneglycol.

If the gas block is in fluid communication with the coolant, the coolant is preferably water. Other coolants may be contemplated, however, these alternative coolants must be miscible with water, must not compromise the fuel cell performance due to contamination, and the gas block must have a suitable pore size as described later.

Referring to FIG. 1A, there may be a flow field 22 on the inside surface 14 of the cathode plate 12. The flow field 22 may be in an interdigitated configuration as described more fully below. The flow field 22 may be formed on the inside surface 14 of the cathode plate 22 by molding, milling, compression and other processes, all known in the art.

The interdigitated flow field 22 is described by following the path of cathode gas through the flow field 22. The flow field 22 begins with a feed side flow inlet 28. The feed side flow inlet 28 is capable of being in fluid communication with a cathode gas supply line (not shown). In one embodiment, the feed side flow inlet 28 may be in proximity to an edge 13a through 13d of the cathode plate 12. In another embodiment the cathode plate 12 may be a square and the feed side flow inlet 28 may be at a corner of the cathode plate.

The feed side flow inlet 28 may be in fluid communication with a feed side internal plenum 30. In another embodiment, the feed side internal plenum 30 runs along an edge 13a through 13b of the cathode plate 12.

Extending from the feed side internal plenum 30, there may be one or more feed side interdigitated channels 32 that are in fluid communication with the feed side internal plenum 30. Each of these feed side interdigitated channels 32 has a terminal dead-end 34. As explained more fully below, the feed side interdigitated channels 32 may be interdigitated with dead-end exhaust side interdigitated channels 37. In one embodiment, there may be a multiplicity of feed side interdigitated channels 32 that are substantially perpendicular the feed side internal plenum 30 and extend to one side of the feed side internal plenum 30 such that there is an array of parallel feed side interdigitated channels 32.

Adjacent to and/or between the feed side interdigitated channels 32 there may be a plurality of exhaust side interdigitated channels 36. The exhaust side interdigitated channels 36 run along-side the feed side interdigitated channels 32. The spacing is discussed below. The exhaust side interdigitated channel 36 that is next to a feed side interdigitated channel 32 is referred to as a neighboring channel. Each of the exhaust side interdigitated channels 36 have a terminal dead-end 37. In one embodiment, there may be a multiplicity of exhaust side interdigitated channels 36 that are substantially parallel and interdigated with substantially parallel feed side interdigitated channels 32.

The exhaust side interdigitated channels 36 may be in fluid communication with an exhaust side internal plenum 38. In another embodiment, the exhaust side internal plenum 38 may run along an edge 13a–13d of the cathode plate 12 and this edge is oppositely opposed an edge along which runs the feed side internal plenum 30.

The exhaust side internal plenum 38 ends into an exhaust side flow outlet 40. The exhaust side flow outlet 40 is capable of being in fluid communication with a cathode gas exhaust line (not shown). In one embodiment, the exhaust side flow outlet 40 may be in proximity to the edge of the cathode plate 12. In another embodiment, the cathode plate 12 may be a square and the exhaust side flow outlet 40 is at a corner of the cathode plate 12.

The inside surface 14 of the cathode plate 12 where there are no channels or plenums is referred to as land 42. The land between the feed side interdigitated channels 32 and the exhaust side interdigitated channels 36 is referred to as the land between the interdigitated channels 44.

As follows from the foregoing, the interdigitated channels on the feed side 32 are only in fluid communication with the feed side internal plenum 30. That is, the feed side interdigitated channels 32 are not in direct fluid communication with the exhaust side interdigitated channels 36 and not in communication with the exhaust side internal plenum 38. Likewise, the exhaust side interdigitated channels 36 are only in fluid communication with the exhaust side internal plenum 38. That is, the exhaust side interdigitated channels 36 are not in fluid communication with the feed side interdigitated channels 32 and not in communication with the feed side internal plenum 30.

The spacing or width between feed side interdigitated channels 32 and exhaust side interdigitated channels 36 may be set such that there may be convection of cathode gas from a feed side interdigitated channel 32 through a gas diffusion layer 26, discussed below, to a neighboring exhaust side interdigitated channel 36. The configuration provides for a higher pressure in a feed side interdigitated channel 32 compared to a neighboring exhaust side interdigitated channel 36. Referring to FIG. 3, this in turn results in a convection flow of cathode gas illustrated by an arrow 54 from a feed side interdigitated channel 32 through the gas diffusion layer 26 to a neighboring exhaust side interdigitated channel 36. The foregoing is also illustrated in FIG. 1A. The convection flow through the gas diffusion layer 26 is explained in more detail below.

For optimal operation of the fuel cell, there may be cathode gas convection along the entire length of a feed side interdigitated channel 32. That is, a condition does not result where cathode gas only passes by convection over a portion of the length of the feed side interdigitated channel. To set the spacing or width between feed side interdigitated channels 32 and exhaust side interdigitated channels 36, the following may be applied. Referring to FIG. 1A, as cathode gas flows 54 through the gas diffusion layer 26 discussed below from a feed side interdigitated channel 32 to an exhaust side interdigitated channel 36, there is a flow resistance and concomitant pressure drop. That is, there is a pressure drop as cathode gas passes over the land between the interdigitated channels 44. The greater the width of the land 44, the greater the pressure drop. As cathode gas passes along the length of a feed side interdigitated channel 32 from the feed side internal plenum 30 to the dead-end 34 there may be a pressure drop.

The pressure drop of cathode gas in passing the length of the feed side interdigitated channel 32 may be much less than the pressure drop as cathode gas passes over the land between the interdigitated channels 44. Put another way, the pressure drop over the land 42 between the interdigitated channels 44 may be much greater than the pressure drop across the length of the channel 56. Therefore, the channel will be filled with cathode gas before flow occurs across the land. A gas and/or fluid takes the path of least resistance. Hence, a uniform flow of gas over the land occurs along the flow channel.

In one embodiment of the invention, the ratio of pressure drop of cathode gas flow over the land between a feed side interdigitated channel 32 and a neighboring exhaust side interdigitated channel 36 and the feed side interdiditated channel 32 cathode gas flow 54 is in the range of about 8:1 to about 15:1. For a GDL, Toray TGPH-090 with a porosity of about 85%, the land width between the interdigitated channels, with 8 inch length, is in the range of about 2 to about 3 times larger than the width of the interdigitated channels 32 and 36.

The porous gas block medium 24 may be made out of graphite, sintered metals or a molded composite. In a molded composite, carbon fiber, glass fibers, resin fibers or combination of the foregoing may be mixed with a binding resin. The binding resin may be a thermoset resin, such as a thermoplastic, a phenolic thermoset resin, or a flouropolymer thermoset resin. An unwoven fabric may be used for the porous gas block medium 24. The porous gas block medium is hydrophilic.

The pores may be sized such that water is sipped off to the outside of the plate by capillary flow, and cathode gas is blocked from flowing to the outside of the plate. This is referred to a gas block mechanism. The pore size is directed, in part, by the pressure difference between the feed side internal plenum 30 and the feed side interdigitated channels 32 of the fuel cell 32 and the cooling channel 18 in fluid communication with the water reservoir (not shown).

Figure 2:
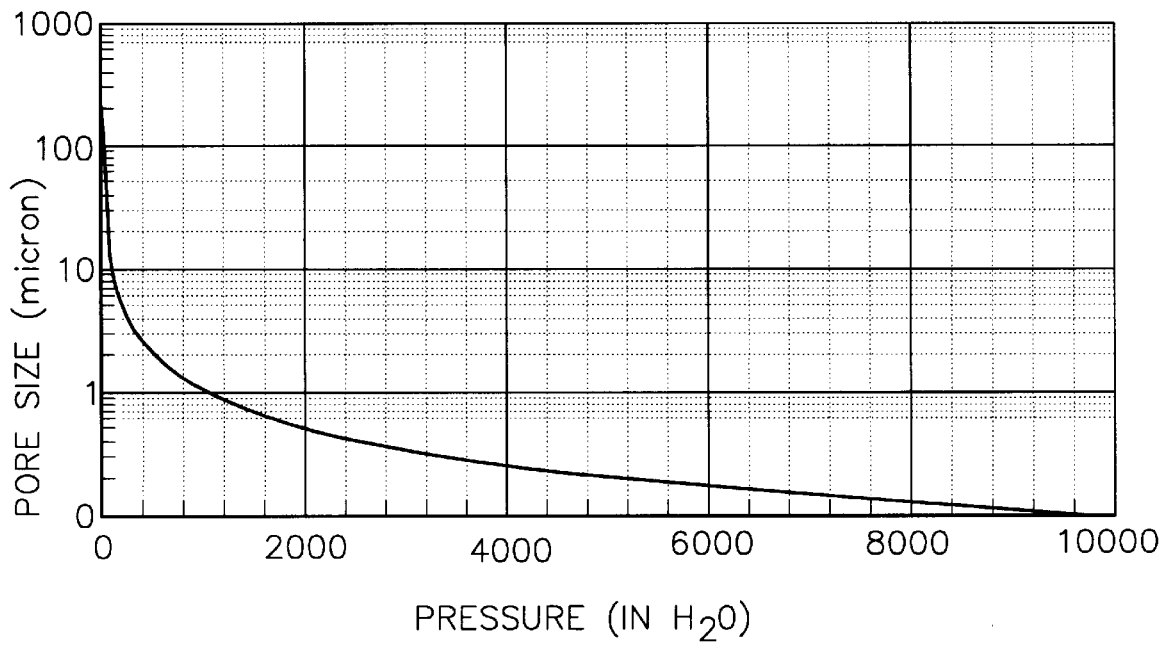
FIG. 2 is a graph illustrating pore size as a function of pressure difference between cathode gas and cooling water flow.

Referring to FIG. 2, one of the considerations in selecting pore size may be that the capillary pressure holds in this pressure differential between the feed side of the fuel cell 28 and the water reservoir 20. As previously mentioned and explained further below, the porous gas block mediums 24 may be in fluid communication with the pressurized cooling channel 18 on the outside surface 16 of the cathode plate 12, as shown in FIG. 1B.

In order to keep the water in the gas block mechanism, the cathode gas pressure should be higher than the water pressure in the water channel but cannot exceed the capillary pressure of the gas block. The capillary pressure is related to gas block properties such as porosity, surface tension, and contact angle as shown below:

$$P_g - P_l < 4\sigma \cos\theta/d, \text{ and } P_g - P_l > 0$$

Where, $P_g$ and $P_L$ are the gas and water pressures, respectively, $\sigma$ and $\theta$ are, respectively, the surface tension and contact angle of the liquid in communication with the gas block, and d is the pore diameter of the gas block layer. When the liquid is water, the surface tension at 80° C. is 63.2 dyne/cm, and the contact angle is equal to zero for a hydrophilic layer for a maximum wettability. With these conditions, the pore size and the pressure difference are related by:

$$d < 1018.3/(P_g - P_l)$$

In this equation, d is in microns and pressure in inches of water. This relationship is graphically shown in FIG. 2.

Not atypical, during operation of the fuel cell, the average pressure of cathode gas in the fuel cell in the feed side internal plenum 30 and interdigitated channels 32 may be 45 psig. A not atypical pressure of the water in the coolant channels and water reservoir may be in the range of 20 psig. The pressure difference between the feed side of the fuel cell and the water reservoir is in the range of 25 psig. Thus, the pore size may be such that the capillary pressure is in excess of 25 psig.

Another consideration in sizing the pores may be that the pore size be decreased below the size at which cathode gas break through occurs. The larger the pore size the more undesirable is the pore size from the perspective of gas breakthrough. While water has a high surface tension and a high capillary pressure can be maintained without small pore sizes, the pore size must not be so large that gas break through occurs.

A further consideration may be that any of the materials used for the porous medium do not have a single pore size. The materials may be comprised of capillaries having a range of pore sizes. The materials may be definable in terms of a mean pore size, maximum pore size, minimum pore size and a distribution about the mean pore size. Accordingly, the material selected for the porous gas block medium has an overall distribution of pore sizes that substantially has the foregoing properties.

In one embodiment of the invention, the pores of the porous gas block medium may be such that the porous medium has a bubble point that is above the gaseous pressure in the fuel cell at the inlet side. In another embodiment of the invention, the pores of the porous gas block medium 24 are such that the porous medium has a bubble point in the range of about 10 to about 40 psig above the gaseous pressure in the fuel cell at the inlet side. As is well established in the art, a bubble point is measured as follows. The porous gas block medium is submerged in water. The pressure to displace water through the porous gas block medium called the bubble point (BP) pressure is measured. A bubble point does not measure a single individual pore diameter. Rather, the bubble is reflective of the range of pore sizes in the porous gas block medium 24. In this case the pressure difference between the gas and liquid phases should be positive, and less than the bubble point pressure, that is, $$P_g - P_l < P_{BP}, \text{ and } P_g - P_l > 0$$

The porous gas block medium 24 may function such that water is sipped off to the outside of the plate by capillary flow, and cathode gas is blocked from flowing to the outside of the plate. More particularly, the water may be sipped off to cooling channels 18 on the opposite side of the cathode plate 12 and then to a water reservoir 20. Thus, there is a gas block mechanism for water removal in fuel cells.

Referring to FIG. 1A, the porous gas block medium 24 may be positioned somewhere in the land between the interdigitated channels 44 adjacent to the flow field 22 so as to be in communication with the flow field 22. In forming the flowfield 22 on the inside surface of the cathode plate 12 by molding, milling, compression and other processes known in the art, spaces may be left for insertion of the porous gas block medium 24. The porous gas block mediums 24 may be inserted and held in place by either friction or adhesives or other procedures, all of which are known in the art of making cathode plates. Alternatively, the porous gas block medium 24 can be molded with the cathode plate 12 having channels.

Continuing to refer to FIG. 1A, there may be at least one porous gas block medium 24 positioned in association with each feed side interdigitated channel 32.

Referring to FIG. 1B, the positioning of the porous gas block mediums 24 directs the positioning of the pressurized water channel 18 such that the water channel 18 may be positioned at the outside surface 16 of the cathode plate 12 so as to be in fluid communication with each of the porous gas block mediums 24. FIG. 1B shows a cross-sectional view of interdigitated flow field 22 with a gas block mechanism taken along line A—A of FIG. 1A. FIG. 1B shows how the gas block layer may be in contact with a water channel 18 on the other side of the cathode plate 12. The comb shape gas block layer may be fixed to the plate by friction insert as discussed above. This mechanism requires one water channel for each cell, a set of one cathode and one anode. The water channel may be manifolded to the coolant flow of the fuel cell stack.

Figure 4A:
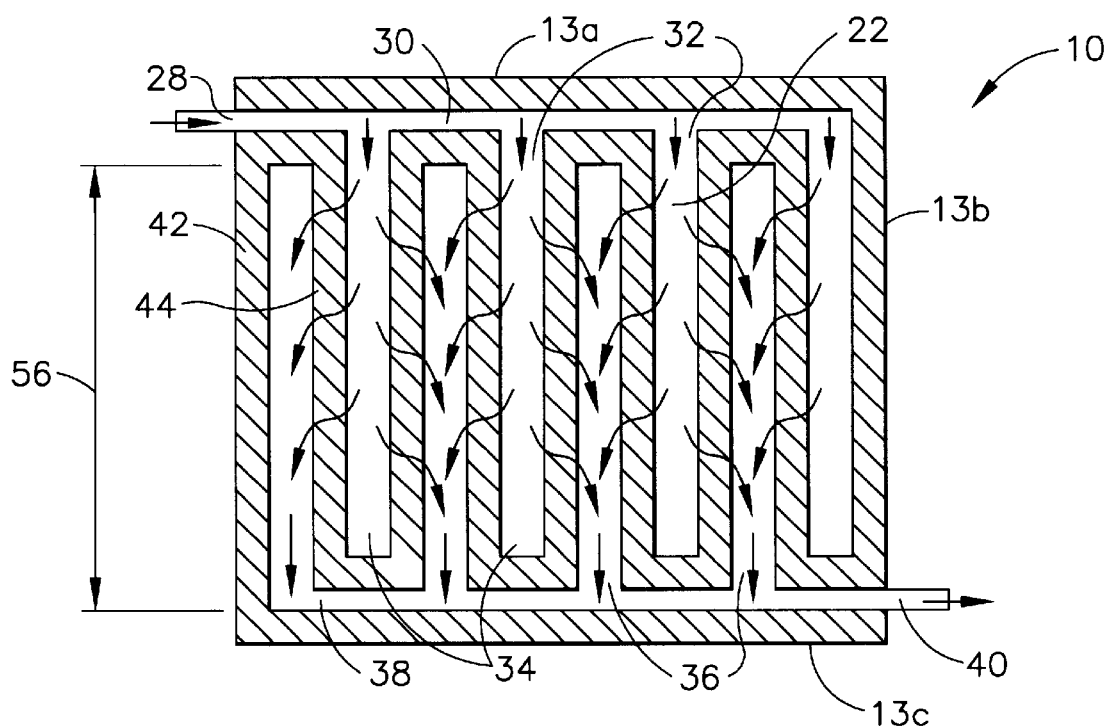
FIGS. 4A–C are top views of the cathode plate of a conventional prior art fuel cell at different times during the operation of the fuel cell showing the accumulation of liquid water.
Figure 4B:
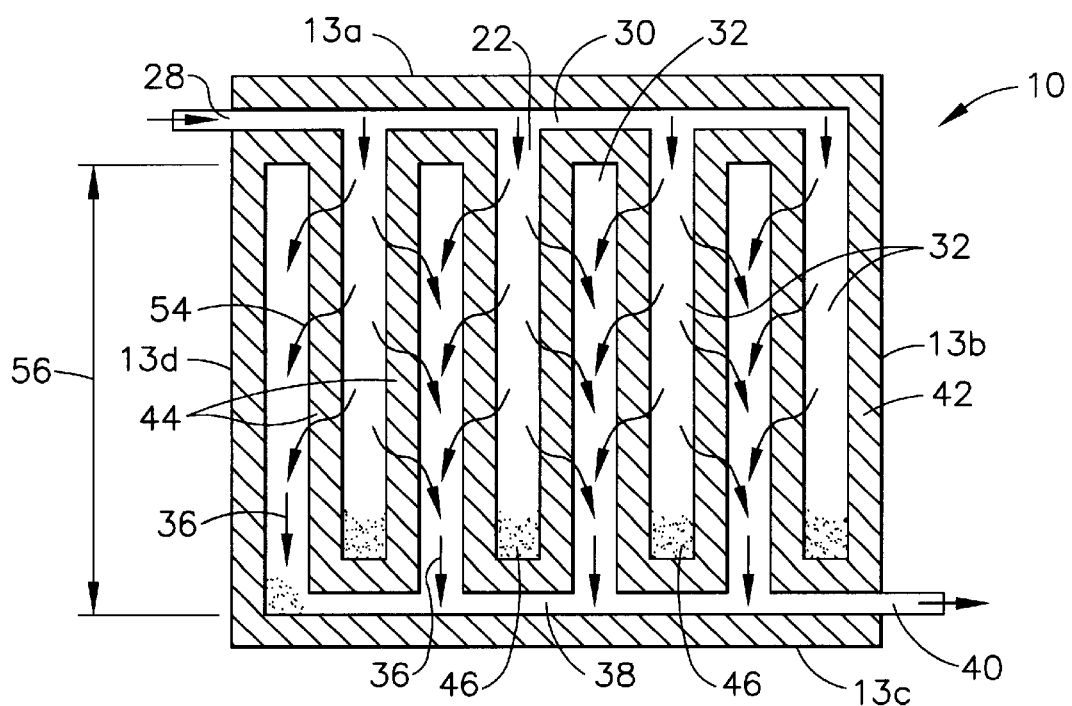
Figure 4C:
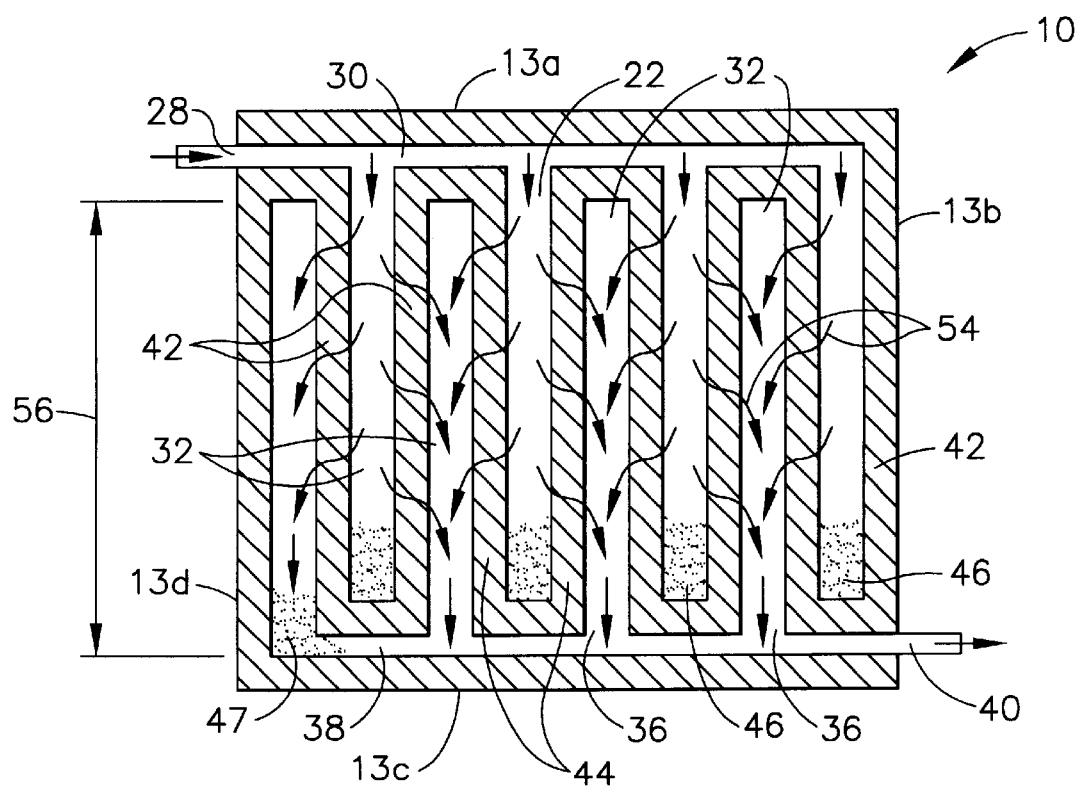

Referring to FIGS. 4B and 4C, in another aspect of the present invention, there may be porous gas block mediums 24 positioned at each of the points where water liquid accumulates in the flow field 46. There are two forces that direct where water accumulates. One is gravity and the other is pressure from the flow of cathode gas in the feed side interdigitated channel 32. There are three possible relationships between these forces. These forces can vector in phase in the same direction and be fully additive, or they can vector 180 degrees out of phase in opposite direction and be fully subtractive. In the alternative, they could be partially out of phase where one will dominate the other.

In a common configuration, the feed side flow inlet 28 and feed side internal plenum 30 may be at a higher gravitational potential that is, on top of the dead ends of the feed side interdigitated channels 32. Accordingly, gravity and cathode gas pressure may each be directed toward the dead-end 34. Liquid water accumulates 46 at the terminal dead-ends 34. The gas block porous medium may be positioned adjacent to the dead-end 34, as shown in FIG. 1A.

It is within the scope of this invention for all the land 42 to be a porous gas block medium 24. This configuration may be particularly advantageous in a microgravity environment especially with a low terminal sheer force from cathode gas pressure where water may not accumulate at one point or area in a feed side interdigitated channel 32.

Optionally, in an embodiment of the present invention, a porous gas block medium 41 may be positioned in the land adjacent to the exhaust side internal plenum 38 on the side of the plenum opposite the terminal dead-ends 37 of the feed side interdigitated channels 32. Such a porous gas block medium 41 at the land adjacent to the exhaust side internal plenum 38 may be needed to avoid water hold up in the exhaust side internal plenum 38.

The gas diffusion layer may be made out of a resilient and conductive material that has microscopic porosity. The microscopic porosity may be in communication with one to another so as to allow cathode gas to pass through the gas diffusion layer. Suitable materials include carbon fabric, carbon fiber paper, porous carbon cloth or porous carbon paper. A metal screen can be used. Carbon fibers may be a preferred material. The gas diffusion layer is hydrophobic.

An exemplary method for preparation of a gas diffusion layer may be to provide pitch fibers and pan fibers polyacrylonitrile without graphite or other organic matter. These fibers may be combined with a casting resin to form a suspension. The suspension may be cast into a paper. Subsequently, the cast paper may be dried. This may be followed by baking in a nitrogen atmosphere and a high temperature. Thermal degradation occurs to carbonize the paper.

Referring to FIG. 3, the paper may be laminated or otherwise adhered to the inside surface 14 of cathode plate 12 or by physical contact only. It may be closely positioned and over the land 42 and interdigitated flow field 22. This may be accomplished using procedures that are well known to persons of ordinary skill in the art.

To use and operate the cathode plate assembly, it is installed at the cathode side of an electrochemical fuel cell that utilizes anode and cathode gases. The cell may be actuated by passing anode and cathode gas through the fuel cell so as to generate an electric current. Without any manual intervention, the cathode plate assembly performs its function of removing produced water. The water is sipped off to the outside of the plate by capillary action of the porous medium. At the same time, cathode gas may be blocked from escaping with the sipped off water.

The interdigitated flow field 22 provides for a larger area to deliver cathode gas through the diffusion layer to the membrane of the fuel cell. Further, the interdigitated flow field 22 allows flow of the cathode gas by convection. The result being better mass transfer of cathode gas and produced water being swept away than that which occurs in a conventional fuel cell. This augments the reaction and improves efficiency and serves to reduce the effect of or eliminate mass transport limited operations. The foregoing advantages are explained further below.

The previously described versions of the present invention have many advantages. One advantage may be that the gas block mechanism collects produced water to the outside of the fuel cell and at the same time blocks the flow of cathode gas out of the cell. Referring to FIGS. 4A–C, shown is the reactant flow through interdigitated flow field 22 of a prior art fuel cell. At the operation initiation, the flow channels are clear of any product water, as shown in 4A.

As operation continues, water is produced 46 in the flow field 22 on the cathode side of the fuel cell. The high flow resistance through the hydrophobic gas diffusion layer hinders flow of water with the reactant. Consequently, liquid water collects at the dead-end 34 of the feed side interdigitated channels 32 high-pressure channels, as shown in FIG. 4B.

FIG. 4C shows a flow condition where the accumulated produced liquid water 46 has piled up and filled up more volume of the channels. At such a situation, the net flow area through the GDL is reduced. This, in turn, causes higher flow rate per unit area of the GDL, and consequently, a higher pressure head that is adequate to displace through the hydrophobic GDL the increment of produced water. At this equilibrium condition, the accumulated produced liquid water 46 is swept to low-pressure channels 47, and flows out of the fuel cell. However, at this condition, a significant portion of the channels is blocked by the water, which reduces the cell's active area. Consequently, there is deterioration of the cell performance.

In a fuel cell according to one aspect of the present invention as shown in FIG. 1A, the feed side interdigitated flow channels 32 may have a porous gas block medium 24 at the dead-end 34 portion of the high-pressure channels. Optionally, there may be a porous gas block medium 41 in the land 42 adjacent top exhaust side internal plenum 38. The porous gas block mediums 24 and 41 help in seeping produced liquid water from the dead ends of the feed side interdigitated channels 32 to the exhaust side interdigitated channels 36.

From the exhaust side interdigitated channels 36, the liquid water may be blown out of the cell. Simultaneously, the porous gas block mediums 24 may be in fluid communication with coolant channels 18 and liquid water passes out of the cell through the coolant channels. A porous gas block medium 41 at the land adjacent to the exhaust side internal plenum 38 may be needed to avoid water hold up in the internal plenum and is in communication with the coolant channels.

Another advantage may be improved mass transfer of cathode gas. It is generally accepted that a low reactant concentration typically, oxygen in the cathode flow stoichiometric ratio slightly more than one is desired to increase the fuel cell overall efficiency. However, in conventional flow fields, which are not interdigitated, low concentration results in low diffusion transport rates in the gas diffusion layer. This, in turn, leads to either inefficient operation or limited reaction and interrupts the fuel cell operation.

Figure 5:
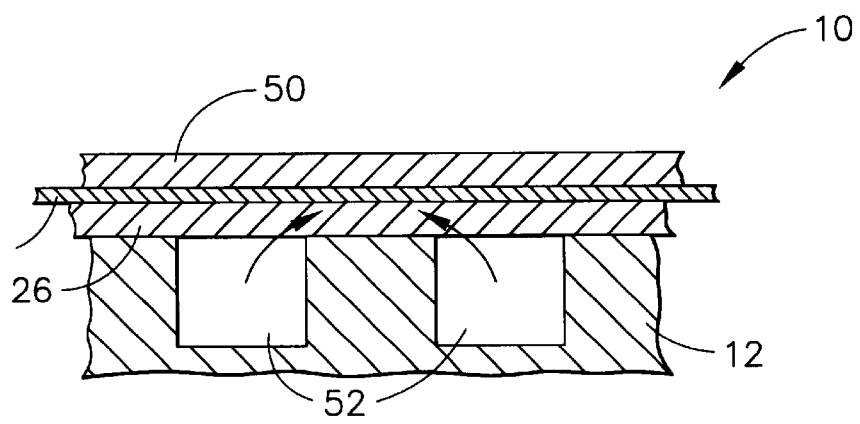
FIG. 5 is a cross-sectional view of a conventional cathode plate assembling positioned against a polyelectrolyte membrane showing the diffusion flow of cathode gas through the GDL.

Referring to FIG. 5, shown is cross-section of a conventional fuel cell without an interdigitated flow field. There is an array of parallel flow channels. Shown are two neighboring channels 52. Each channel originates at a feed side plenum (not shown) and ends at an exhaust side plenum (not shown.) Also shown in FIG. 5 is the gas diffusion layer on the cathode side 26; a polyelectrolyte membrane with associated catalytic layers 48 and a gas diffusion layer on the anode side 50. The cathode plate 12 is shown implicitly as being the area underneath the gas diffusion layer on the cathode side 26.

The pressure at any given distance from the feed side plenum in any two neighboring channels may be just about equal. Hence, there is no bulk flow of cathode gas from one channel through the gas diffusion layer 26 to the neighboring channel. Cathode gas only enters the gas diffusion layer by diffusion. The two arrows in the figure indicate the flow of cathode gas by diffusion. Diffusion is a slow process. It delivers less than the desirable amount of cathode gas to the membrane of the fuel cell. Liquid water that is produced from operation of the fuel cell accumulates with no physical force to displace the liquid water.

Referring to FIG. 3, the interdigitated flow field 22 of the present invention may allow flow of the reactant through a larger area of the gas diffusion layer 26. As explained above, the pressure differential between feed side interdigitated channels 32 and exhaust side interdigitated channels 36 provides a convection transport of cathode gas 54 to augment the reaction and improve the efficiency, or eliminate the mass transport limited operations. As stated, the flow of cathode gas by convection is indicated by arrow 54. Also shown in FIG. 3 is a polyelectrolyte membrane 48 with associated catalytic layers 48 and a gas diffusion layer 50 on the anode side 58. The cathode plate 12 is shown implicitly as being the area underneath the gas diffusion layer on the cathode side 26.

As indicated, a conventional fuel cell from the prior art requires cooling plates for every PEM cell in the stack (FIG. 2 in U.S. Pat. No. 5,840,414 and FIG. 3 in U.S. Pat. No. 2; 5,853,909). An advantage of the present invention is that there is no need for a coolant plate for each cell where the cooling rate allows for one coolant plate for more than one cell. In this case, the single water channels in a cell are manifolded to the coolant flow that also feeds the coolant plates in the stack. Therefore, there is a major saving in weight and volume becomes possible.

Although the present invention has been described in considerable detail with reference to certain preferred versions thereof, other versions are possible when substituted, varied and/or modified materials and steps are employed. For example, and not by way of limitation, there can be a double wide interdigitated flow field where the feed side internal plenum has interdigitated channels extending to both sides of it with two exhaust side internal plenums on each sided having intergititated channels interfacing the feed side interdigitated channels 32. Another example of a variation is to have multiple flow inlets and/or multiple flow outlets. These other versions do not depart from the invention. Therefore, the spirit and scope of the appended claims should not be limited to the description of the preferred versions contained herein.

We claim:

1. A plate assembly for use in a fuel cell comprised of:
   one of a cathode plate with cathode gas and an anode plate with anode gas having a first major surface and a second oppositely opposed major surface;
   a flow field for a gas within the first major surface comprised of feed side interdigitated channels and exhaust side interdigitated channels such that in the operation of the fuel cell there is flow of said gas by convection from feed side interdigitated channels to exhaust side interdigitated channels;
   at least one porous gas block medium positioned in the one of a cathode and anode plate adjacent to the flow field having pores sized such that liquid water in the flow field is sipped off by capillary flow and said gas is blocked;
   a gas diffusion layer positioned over the first surface of the one of a cathode and anode plate and flow field therein; and
   a liquid water channel at the second major surface of the one of a cathode and anode plate and in fluid communication with the at least one porous gas block medium such that liquid water flows from the porous gas block medium to the water channel.

2. The plate assembly of claim 1 wherein the at least one porous gas block medium has a bubble point in the range of about 10 psig to about 70 psig.

3. The plate assembly of claim 1 wherein the at least one porous gas block medium is positioned adjacent where liquid water accumulates in the flow field as the fuel cell operates.

4. The plate assembly of claim 1 wherein the one of a cathode and anode plate is a porous gas block medium having pores sized such that liquid water in the flow field is sipped off by capillary flow and said gas is blocked.

5. A plate assembly for use in a fuel cell with a pressurized gas and a pressurized water comprised of:
   one of a cathode plate with cathode gas and an anode plate with anode gas having a first major surface and a second oppositely opposed major surface;
   a flow field for said pressurized gas within the first major surface having:
      a feed side having a feed side internal plenum in fluid communication with one or more feed side interdigitated channels having width and with dead-ends; and
      an exhaust side having an exhaust side internal plenum in fluid communication with a plurality of exhaust side interdigitated channels having width and with dead-ends,
      wherein the feed side and exhaust side interdigitated channels are in an intedigitated configuration defining land between the interdigitated channels such that in the operation of the fuel cell there is flow of said gas by convection from feed side interdigitated channels to exhaust side interdigitated channels;
   a multiplicity of porous gas block mediums positioned in the one of a cathode and anode plate adjacent to each feed side interdigitated channel at points where liquid water forms or collects during the operation of the fuel cell and having pores sized such that liquid water in the feed side interdigitated channels is sipped off by capillary flow and said gas is blocked;
   a gas diffusion layer positioned over the first surface of the one of a cathode and anode plate and flow field therein; and
   a water channel at the second major surface of the one of a cathode and anode plate in fluid communication with each porous gas block medium through which pressurized coolant flows and where the pressure of said gas in feed side interdigitated channels is greater than the pressure of coolant in the cooling channel and the pressure difference is less than the bubble point pressure of the gas block such that liquid water flows from each porous gas block medium into the cooling channel.

6. The plate assembly of claim 5 wherein each porous gas block medium has a bubble point in the range of about 10 psig to about 70 psig.

7. The plate assembly of claim 5 wherein there is a porous gas block medium adjacent to the exhaust side internal plenum having pores sized such that liquid water in the exhaust side internal plenum is sipped off by capillary flow and said gas is blocked.

8. The plate assembly of claim 5 wherein the one of a cathode and anode plate is a porous gas block medium having pores sized such that liquid water in the flow field is sipped off by capillary flow and said gas is blocked.

9. The plate assembly of claim 5 wherein the ratio of pressure drop per unit length of said gas flow over the land between a feed side interdigitated channel and a neighboring exhaust side interdigitated channel and the feed side interdiditated channel said gas flow is in the range of about 8:1 to 15:1.

10. A cathode plate assembly for use in a fuel cell with a pressurized cathode gas and a pressurized water comprised of:
   a cathode plate that is a four sided polygon having a first major surface, a second oppositely opposed major surface, and a first and third and second and fourth oppositely opposed pairs of edges where the first edge is at a higher gravitational potential energy than the third edge;
   a flow field for pressurized cathode gas within the first major surface and having:
      a feed side internal plenum running parallel to the first edge of the cathode plate;
      a plurality of feed side interdigitated channels having widths that are in fluid communication with and substantially perpendicular to the feed side internal plenum that extend toward the third edge and terminate at dead-ends;
      an exhaust side internal plenum running parallel to the third edge of the cathode plate;
      a plurality of exhaust side interdigitated channels having widths that are in fluid communication with and substantially perpendicular to the exhaust side internal plenum that extend toward the first edge and terminate at dead-ends and which are interdigitated between the feed side interdigitated channels so as to define land between the interdigitated channels;
      wherein the ratio of pressure drop of the cathode gas flow over the land between a feed side interdigitated channel and a neighboring exhaust side interdigitated channel and the feed side interdiditated channel cathode gas flow is in the range of about 8:1 to 15:1 such that cathode gas flows by convection from the feed side interdigitated channel to a neighboring exhaust side interdigitated channel;
   a multiplicity of porous gas block mediums positioned adjacent to the dead-ends of each of the feed side interdigitated channels having a bubble point in the range of between about 10 psig to about 70 psig such that liquid water is sipped out of the feed side interdigitated channels by capillary flow and cathode gas is blocked;

a gas diffusion layer positioned over the first surface of the cathode plate and flow field therein, and a water channel at the second major surface of the cathode plate in fluid communication with each porous gas block medium through which pressurized water flows and where the pressure of the cathode gas in feed side interdigitated channels is greater than the pressure of water in water channels and the pressure difference is less than the bubble point pressure such that liquid water flows from the porous gas block medium to the water channel.

11. The cathode plate assembly of claim 10 wherein there is a porous gas block medium adjacent to the exhaust side internal plenum having a bubble point in the range of between about 10 psig to about 70 psig such that liquid water in the exhaust side internal plenum is sipped off by capillary flow and cathode gas is blocked.

12. A method for removing liquid water at one of a cathode side and an anode side of an electrochemical fuel cell comprised of the steps of:

providing one of a cathode plate and an anode plate having a first major surface and a second oppositely opposed major surface;

providing a flow field for gas within the first major surface comprised of feed side interdigitated channels and exhaust side interdigitated channels such that in the operation of the fuel cell there is flow of said gas by convection from feed side interdigitated channels to exhaust side interdigitated channels;

providing at least one porous gas block medium positioned in the one of a cathode and anode plate adjacent to the flow field having pores sized such that liquid water in the flow field is sipped off by capillary flow and said gas is blocked;

providing a gas diffusion layer positioned over the first surface of the one of a cathode and anode plate and flow field therein; and providing a liquid water channel at the second major surface of the one of a cathode and anode plate and in fluid communication with the at least one porous gas block medium passing said gas through the fuel cell so as to generate an electric current, whereby water is sipped off through a porous medium to the liquid water channel.

* * * * *